US012579265B2

(12) United States Patent
Seo

(10) Patent No.: US 12,579,265 B2
(45) Date of Patent: Mar. 17, 2026

(54) APPARATUS AND METHOD FOR PROTECTING DATA IN LINUX-BASED OPERATING SYSTEM

(71) Applicant: REALSECU Co. Ltd., Busan (KR)

(72) Inventor: Myeong Won Seo, Busan (KR)

(73) Assignee: REALSECU Co. Ltd., Busan (KR)

( * ) Notice: Subject to any disclaimer, the term of this patent is extended or adjusted under 35 U.S.C. 154(b) by 202 days.

(21) Appl. No.: 18/572,230

(22) PCT Filed: Oct. 27, 2023

(86) PCT No.: PCT/KR2023/016835
§ 371 (c)(1),
(2) Date: Dec. 20, 2023

(87) PCT Pub. No.: WO2024/106794
PCT Pub. Date: May 23, 2024

(65) Prior Publication Data
US 2025/0094583 A1      Mar. 20, 2025

(30) Foreign Application Priority Data

Nov. 17, 2022    (KR) ........................ 10-2022-0154631
Oct. 5, 2023    (KR) ........................ 10-2023-0132725

(51) Int. Cl.
*G06F 21/56*         (2013.01)
*G06F 21/62*         (2013.01)

(52) U.S. Cl.
CPC ........ *G06F 21/565* (2013.01); *G06F 21/6209* (2013.01)

(58) Field of Classification Search
CPC .... G06F 21/565; G06F 21/6209; G06F 21/53; G06F 21/60; G06F 21/6218; H04L 9/08
See application file for complete search history.

(56) References Cited

U.S. PATENT DOCUMENTS

2019/0081990 A1* 3/2019 Roy ...................... H04L 9/0891
2020/0250092 A1* 8/2020 Szeredi ............... G06F 12/0897

OTHER PUBLICATIONS

CN13591139A (Machine Translation of CN13591139A) (Year: 2021).*

* cited by examiner

*Primary Examiner* — Brian F Shaw
(74) *Attorney, Agent, or Firm* — HARVEST IP LAW LLP

(57) ABSTRACT

Provided is an apparatus for protecting data in a Linux-based operating system, the apparatus including: a physical storage device; and a processor provided with a user application, a user library, a virtual file system (VFS), a kernel-based file system, a Filesystem in Userspace (FUSE) kernel driver, and a FUSE user daemon as software modules.

A file containing protection target data may be safely protected by being stored in a FUSE storage area that is accessible only in a FUSE mount state.

6 Claims, 5 Drawing Sheets

USER INTERFACE DEVICE (30) — PROCESSOR (10) — STORAGE DEVICE (20)

/path/to/fuse-data
(FUSE FILE PATH)

DATA IN FUSE MOUNT          DATA IN FUSE UNMOUNT

APPARATUS AND METHOD FOR PROTECTING DATA IN LINUX-BASED OPERATING SYSTEM

CROSS-REFERENCE TO RELATED APPLICATIONS

This application claims the benefit under 35 U.S.C. section 371, of PCT International Application No. PCT/KR2023/016835, filed on Oct. 27, 2023, which claims foreign priority to Korean Patent Application No. 10-2022-0154631, filed on Nov. 17, 2022, Korean Patent Application No. 10-2023-0132725, filed on Oct. 5, 2023, in the Korean Intellectual Property Office, both of which are hereby incorporated by reference in their entireties.

TECHNICAL FIELD

The present invention relates to data protection technology, and more specifically, to a method and apparatus for protecting data in a Linux-based operating system that are capable of storing a file containing protection target data in a FUSE-mounted storage area such that the file may be protected.

The present invention is a technology development and demonstration project of an energy-saving smart lighting platform of the Energy Demand Management Core Technology Development (ET) research project managed by the Korea Institute of Energy Technology Evaluation and Planning under the Ministry of Trade, Industry and Energy as a specialized project management organization, with national project identification number 1415186771 and project number 20202020800220, which has been conducted since Jan. 1, 2023, and will be until Dec. 31, 2023, by the Electronics and Telecommunications Research Institute as the dedicated project implementation agency.

BACKGROUND ART

With the emergence of new technologies, insecure data storage has become one of the most critical network security issues.

Typically, in Linux-based operating systems, such as Ubuntu, CentOS, etc., data is stored in a Linux file system, which is used as a standard interface for applications. The Linux file system is a built-in layer of a Linux-based operating system that sorts files on a disk storage and manages file names, file sizes, creation dates, and more information about the files.

In addition, important data, such as encryption keys used to protect the above-described data, is restricted to only users with root authority for access. However, when an attacker has the root authority, it is difficult to protect the data.

As a data protection technology in the conventional Linux-based operating system, there is Korean Registered Patent No. 10-1416618 registered with the Korean Intellectual Property Office under the title of "Linux kernel security-based intrusion prevention system." This discloses an intrusion prevention system based on Linux kernel security including: an IP table in which IP addresses to be blocked are recorded; a database which records the IP addresses to be blocked; a detecting engine which determines whether a packet that has not been blocked by the IP table is an attack; a blocking engine which stores an IP address of the packet determined as an attack (hereinafter, an attack IP address) in the database, and issues an order to store the attack IP address in the IP table; and a resource monitoring module which shows the IP addresses stored in the database, thereby detecting an intrusion into a Linux system and limiting access authority of the access detected as an intrusion.

In addition, there is Korean Registered Patent No. 10-1414580 registered with the Korean Intellectual Property Office under the title of "Linux operating system based on multi-level-based security." This discloses a system including: an access control unit for controlling users' access by applying a Bell-La Padula (BLP) model; a reference monitoring unit provided with a subject security label defining a permission rating and a protection category for a subject, and an object security label defining a permission rating and a protection category for an object; a kernel mode encryption unit referring to the permission rating and the protection category recorded under the subject security label and the object security label to automatically decide whether to perform encryption or not and execute the encryption according to the permission rating and the protection category recorded in a file; and a real-time monitoring unit for recording the access to the file in real time using a dynamic database.

As described above, various security methods applied to Linux-based operating systems have been continuously proposed. However, in Linux-based operating systems, the file system is part of the operating system kernel, and it is very complex and challenging to understand the kernel source code. Therefore, for most developers, implementing data security functions by writing or modifying the kernel file system has been a difficult task. Moreover, due to licensing issues, no file system is integrated into the kernel unless the source code is made public.

Accordingly, there has been an urgent need to develop technology that can effectively protect data in Linux-based operating systems.

DISCLOSURE

Technical Problem

The present invention is directed to a method and apparatus for protecting data in a Linux-based operating system in which a file containing protection target data is stored in a FUSE storage area that is accessible only in a FUSE mounted state, thereby safely protecting the protection target data.

The present invention is also directed to a method and apparatus for protecting data in a Linux-based operating system in which a file containing protection target data recorded in a FUSE storage area is accessible only through an access request made by an authorized user, thereby safely protecting the protection target data.

The present invention is also directed to a method and apparatus for protecting data in a Linux-based operating system capable of, when an access request for a file containing protection target data recorded in a FUSE storage area is a read request, reading the original file, decrypting the read result, and returning the decryption result, and when the access request is a write request, encrypting content to be written, and writing the encrypted content in the original file, thereby safely protecting the protection target data.

The present invention is also directed to a method and apparatus for protecting data in a Linux-based operating system in which a physical file address in a FUSE mounted state is made identical to a physical file address in a FUSE unmounted state, thereby preventing a FUSE-related issue that may occur when one of the files recorded in the dual file addresses is damaged.

Technical Solution

According to an aspect of the present invention, there is provided an apparatus for protecting data, the apparatus including: a physical storage device; and a processor provided with a user application, a user library, a virtual file system (VFS), a kernel-based file system, a Filesystem in Userspace (FUSE) kernel driver, and a FUSE user daemon as software modules, wherein, when the user application provides request information requesting access to a FUSE file path to the user library, the user library provides the request information to the VFS, when a handler for the FUSE file path included in the request information is registered in advance, the VFS determines that a state is a FUSE mounted state and provides the request information to the FUSE kernel driver that is registered in advance, the FUSE kernel driver provides the request information to the FUSE user daemon, the FUSE user daemon directly accesses a file at a file address of the physical storage device predetermined to correspond to the FUSE file path through the kernel-based file system, the FUSE user daemon returns access result information for the file of the file address of the physical storage device to the FUSE kernel driver, the FUSE kernel driver returns the access result information for the file to the VFS, the VFS returns the access result information for the file to the user library, the user library returns the access result information for the file to the user application, and the file for the FUSE file path includes protection target data.

Advantageous Effects

The present invention is implemented to store a file containing protection target data in a FUSE storage area that is accessible only in a FUSE mounted state, thereby safely protecting the protection target data.

The present invention is implemented to allow access to a file containing protection target data recorded in a FUSE storage area only with an access request made by an authorized user, thereby safely protecting the protection target data.

The present invention is implemented to, when an access request for a file containing protection target data recorded in a FUSE storage area is a read request, read the original file, decrypt the read result, and then return the decryption result, and when the access request is a write request, encrypt content to be written, and write the encrypted content to the original file, thereby safely protecting the protection target data.

The present invention is implemented to make a physical file address in a FUSE mounted state identical to a physical file address in a FUSE unmounted state, thereby preventing a FUSE-related issue that may occur when one of the files recorded in the dual file addresses is damaged.

MODES OF THE INVENTION

The present invention is implemented to store a file containing protection target data in a FUSE storage area that is accessible only in a FUSE mounted state, thereby safely protecting the protection target data.

In addition, the present invention is implemented to allow access to a file containing protection target data recorded in a FUSE storage area only through an access request made by an authorized user, thereby safely protecting the protection target data.

In addition, the present invention is implemented to, when an access request for a file containing protection target data recorded in a FUSE storage area is a read request, read the original file, decrypt the read result, and then return the decryption result, and when the access request is a write request, encrypt content to be written and write the encrypted content to the original file.

In addition, the present invention is implemented to make a physical file address in a FUSE mounted state identical to a physical file address in a FUSE unmounted state, thereby preventing a FUSE-related issue that may occur when one of the files recorded in the dual file addresses is damaged.

Prior to the detailed description of the present invention, Filesystem in Userspace (hereinafter referred to as FUSE) will be described. The FUSE project started in 2004 and was implemented in the Linux kernel in 2005. FUSE allows unauthorized users to write their own file systems without editing the kernel source code, thereby avoiding licensing issues.

In addition, since FUSE is located in a user space, which is easy to develop, and a user space program, even when damaged, does not cause damage to the system, the stability of the system increases. In contrast, a program in a kernel file system has such risks.

In addition, user space code can be written in any language and is easy to debug, whereas kernel code is much more complex in writing, and an accidental glitch in the code writing may cause unexpected reboots in the kernel and the system.

In addition, the above-described FUSE has a limitation in performance in that it operates slower than the basic Linux file system depending on the workload (write/read) or hardware, and thus moving the file system to a user space for large-scale data is not efficient.

The present invention uses the above-described FUSE to safely protect protection target data in a Linux-based operating system. In particular, the present invention may limit the protection target to key data, such as encryption keys that are not large, in consideration of workload and central processing unit (CPU) performance degradation.

Hereinafter, a method and apparatus for protecting data according to exemplary embodiments of the present invention described above will be described in detail with reference to the drawings.

<A Schematic Configuration of an Apparatus for Protecting Data>

Figure 1:
FIG. 1 is a schematic block diagram illustrating an apparatus for protecting data according to an exemplary embodiment of the present invention.

First, the configuration of the apparatus for protecting data to which the present invention is applied will be described. FIG. 1 is a schematic block diagram illustrating an apparatus for protecting data according to an exemplary embodiment of the present invention. Referring to FIG. 1, the apparatus for protecting data includes a processor 10, a physical storage device 20, and a user interface device 30.

The processor 10 may be configured to implement FUSE mount (makeFuseMount( )), FUSE unmount (unmount Fuse( )), or read/write (Read/Write data) on a file containing protection target data in a FUSE storage area that is accessible in a FUSE mounted state, according to a user's request through the user interface device 30.

Figure 2:
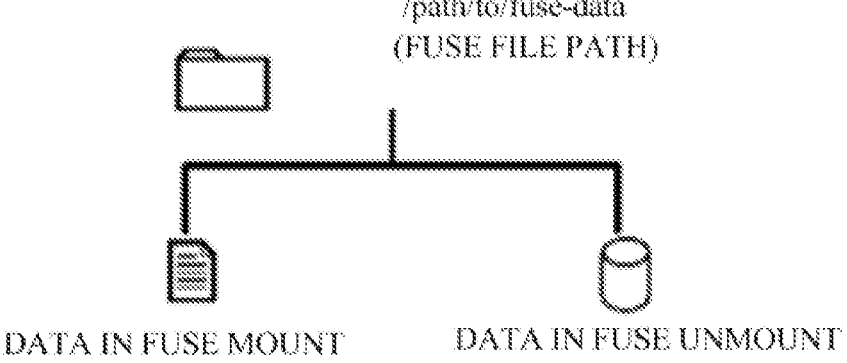
FIG. 2 is a diagram illustrating a FUSE file path according to an exemplary embodiment of the present invention.

The storage device 20 provides a physical storage area and provides a FUSE storage area for storing protection target data in a FUSE mounted state or FUSE unmounted state. Here, the FUSE storage area in the FUSE mounted state or FUSE unmounted state has the same path (/path/to/fuse-data) as shown in FIG. 2, thereby preventing data in the FUSE storage area and a FUSE unmounted state from changing during FUSE mount, and preventing data in the FUSE storage area and a FUSE mounted state from changing during FUSE unmount, and thus promoting the stability of the system.

The user interface device 30 serves as an interface between the processor 10 and the user.

<A Schematic Processing Procedure of the Processor>

Figure 3:
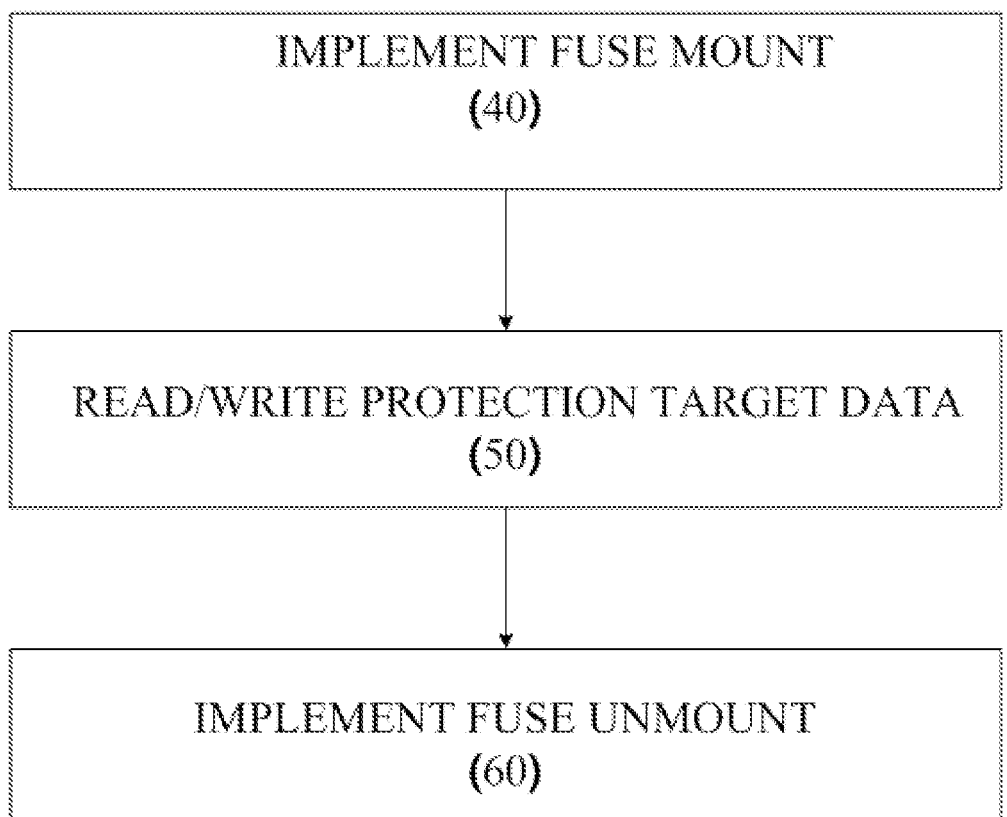
FIG. 3 is a diagram illustrating a schematic processing procedure of a processor shown in FIG. 1.

A schematic processing procedure of the processor 10 will be further described with reference to FIG. 3. When reading or writing of protection target data is requested through the user interface device 30, the processor 10 implements a FUSE mount (makeFuseMount( )) (operation 40). During the FUSE mount, authentication is implemented through user identification information (#uid='rsfuse') and group identification information (#gid='rsfuse').

When the FUSE mount is implemented, the processor 10 reads or writes a file containing protection target data, for example, key data regarding an encryption key and the like, from or to the FUSE storage area (Read/Write data) (operation 50). Here, when an access request for the file containing protection target data recorded in the FUSE storage area is a read request, the processor 10 reads the original file, decrypts the read result, and returns the decryption result, and when the request is a write request, the processor 10 encrypts content to be written and records the encrypted content to the original file, thereby safely protecting the protection target data.

When the reading or writing of the protection target data is completed, the processor 10 implements FUSE unmount (unmountFuse( )) (operation 60).

<Software Architecture of a Processor>

Figure 4:
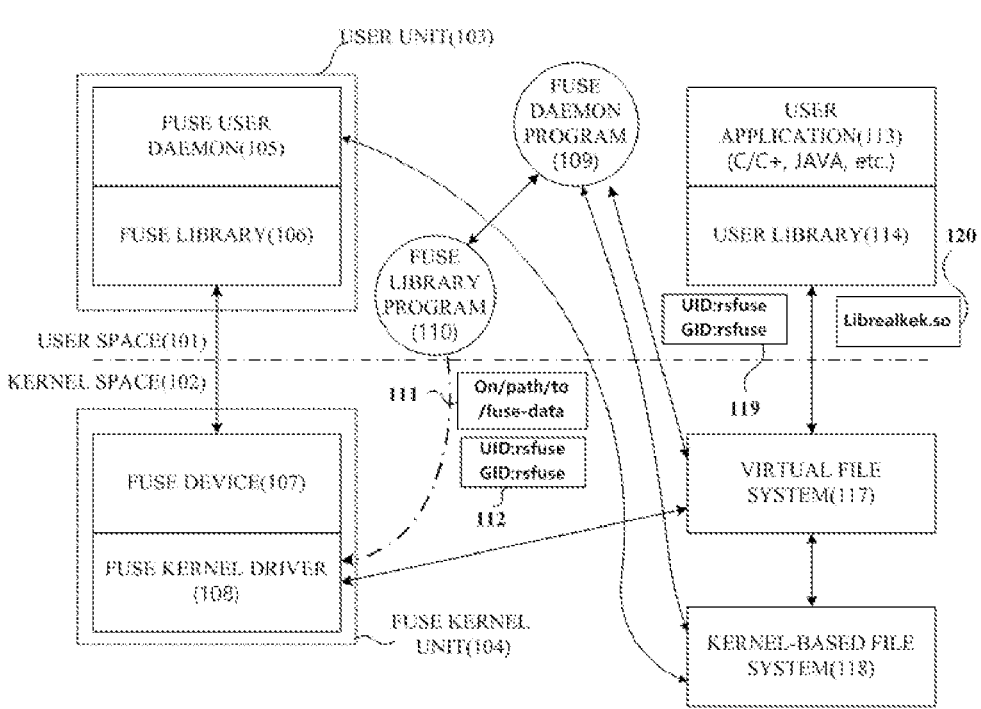
FIG. 4 is a software structure diagram according to an exemplary embodiment of the present invention.

The architecture of software loaded on the processor 10 of the data protection system configured as described above will be further described with reference to FIG. 4. Referring to FIG. 4, software modules provided in the processor 10 may be largely divided into a user space 101 and a kernel space 102.

Software modules belonging to the user space 101 include a user application 113, a user library 114, a user unit 103 for performing a FUSE function, a FUSE daemon program 109, and a FUSE library program 110, and the user unit 103 includes a FUSE user daemon 105 and a FUSE library 106.

In addition, software modules belonging to the kernel space 102 include a virtual file system 117, a kernel-based file system 118, and a FUSE kernel unit 104, and the FUSE kernel unit 104 includes a FUSE device 107 and a FUSE kernel driver 108.

The user application 113 is composed of C/C+, JAVA, etc. and performs functions according to user requests. The above functions include protecting a file containing protection target data as well as reading/writing a file containing protection target data through the FUSE function.

The user library 114 requests file access to the virtual file system 117 located in the kernel space 102 according to a request of the user application 113, and returns result information regarding the file access request provided by the virtual file system 117 to the user application 113. In particular, the user library 114 requests FUSE mount/FUSE unmount to the FUSE daemon program 109 according to a request from the user application 113.

The virtual file system 117 allows access to a plurality of file systems through an abstraction layer present above an actual file system. Such a virtual file system 117 requests file access to the kernel-based file system 118 or the FUSE kernel unit 104 according to a request of the user library 114, the FUSE daemon program 109, or the FUSE user daemon 105, and returns result information regarding the file access request returned by the kernel-based file system 118 or the FUSE kernel unit 104 to the user library 114. In particular, the virtual file system 117 registers information about a handler for the FUSE file path, that is, information about the FUSE kernel driver 108 during FUSE mount.

The kernel-based file system 118 manages the physical storage device 20 and the files therein, and performs operations according to an access request for the physical storage device 20 in a request from the virtual file system 117 and returns a result of the performance to the virtual file system 117. In addition, the kernel-based file system 118 performs a request from the FUSE daemon program 109 present in the user space 101 or the FUSE user daemon 105 of the user unit 103 obtained through the virtual file system 117, and returns a result of the performance to the FUSE daemon program 109 or the FUSE user daemon 105 through the virtual file system 117.

The FUSE daemon program 109 is executed according to a request of the user library 114 to implement FUSE mount, and when the FUSE mount is completed, registers self as the FUSE user daemon 105 and acts as the FUSE user daemon 105. Here, during FUSE mount, the FUSE daemon program 109 receives the file address of the physical storage device for the FUSE file path from the kernel-based file system 118.

When the FUSE mount is completed by the FUSE daemon program 109, the FUSE library program 110 provides FUSE file path information and user and group identification information (UID:RSFUSE, GID:RSFUSE) to the FUSE kernel driver 108 of the FUSE kernel unit 104.

Upon receiving the FUSE file path information and the user and group identification information (UID:RSFUSE, GID:RSFUSE) from the FUSE library program 110, the FUSE kernel driver 108 stores the FUSE file path information and the user and group identification information (UID:RSFUSE, GID:RSFUSE) as well as providing the virtual file system 117 with information indicating that the handler for the FUSE file path is the FUSE kernel driver 108. Here, the virtual file system 117 stores the information, and when a request for the FUSE file path is provided, requests the FUSE kernel driver 108 of the FUSE kernel unit 104 to process the request according to the information.

In addition, upon receiving the request for the FUSE file path, the FUSE kernel driver 108 checks whether user and group identification information (UID:RSFUSE, GID:RSFUSE) included in the request information corresponds to the FUSE file path and performs authentication, and when the authentication is successful, provides an access request for the FUSE file path to the FUSE user daemon 105. Here, the request is provided to the FUSE user daemon 105 via the FUSE device 107 and the FUSE library 106. More specifically, the FUSE kernel driver 108 allocates a FUSE request structure and writes the request to a queue, and the FUSE user daemon 105 reads the FUSE request structure from a queue of the FUSE device 107, and thus the request recorded in the queue may be processed. When the request processing is completed, the FUSE user daemon 105 writes a response to the request to the queue of the FUSE device 107. Based on the response written as descried above, the FUSE kernel driver 108 may confirm that the request has been completed.

The FUSE user daemon 105 reads a FUSE request through the FUSE device 107, processes the request, and then writes a response to the FUSE device 107 using the FUSE library 106 such that data is transmitted and received.

In addition, upon receiving the response information regarding the access request for the FUSE file path from the FUSE user daemon 105, the FUSE kernel driver 108 returns the response information to the virtual file system 117.

In addition, upon receiving the access request for the FUSE file path through the FUSE kernel unit 104, the FUSE user daemon 105 directly accesses the file address of the physical storage device 20, which corresponds to the FUSE file path, through the kernel-based file system 118, and performs reading or writing on the file containing protection target data, which is the original file, and returns the performance result to the FUSE kernel driver 108. Here, the kernel-based file system 118 and the FUSE user daemon 105 implement data communication via the virtual file system 117.

<A Procedure of a Method of Protecting Data>

Figure 5:
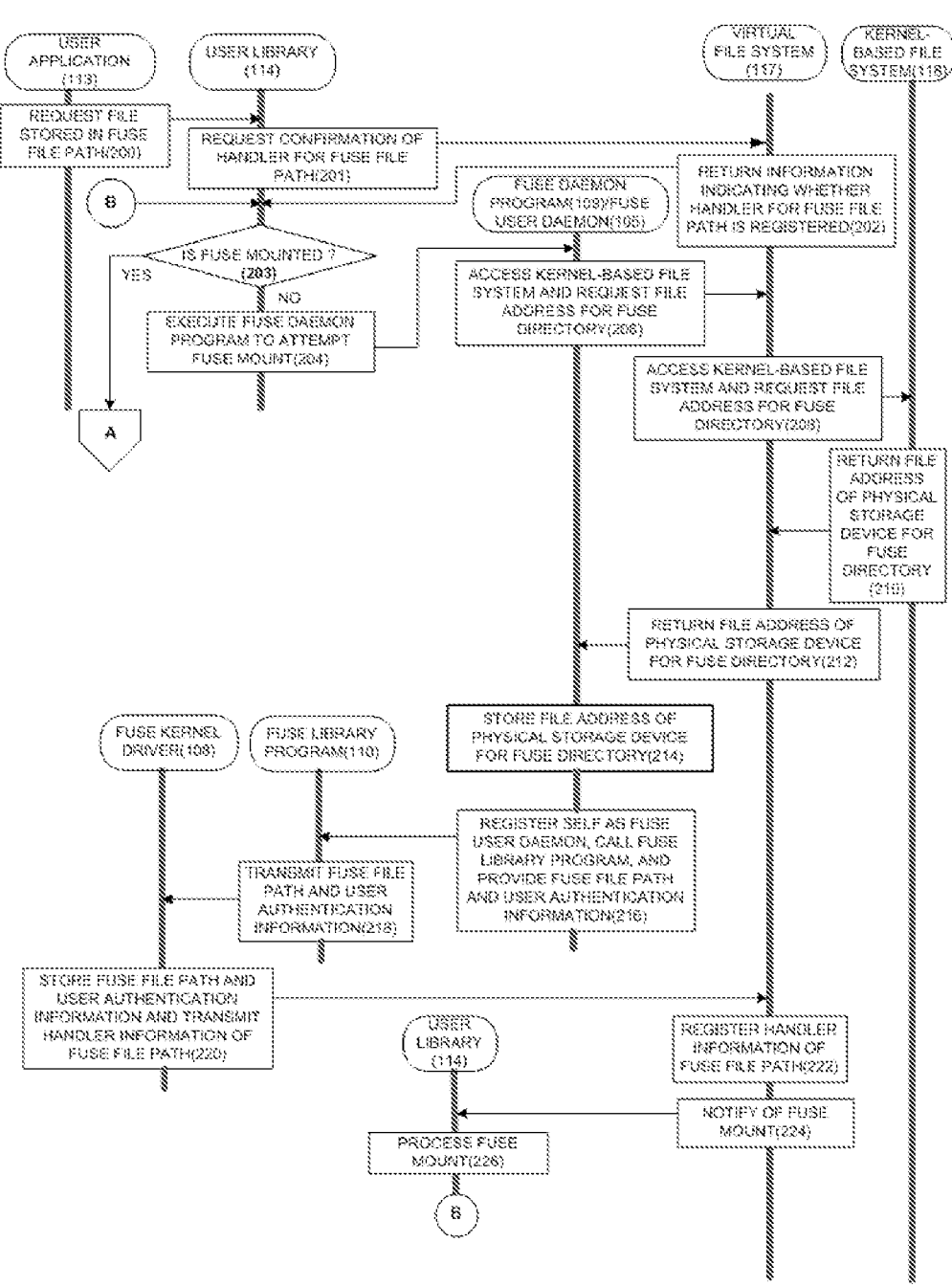
FIGS. 5 and 6 are diagrams showing a procedure of a method of protecting data according to an exemplary embodiment of the present invention.
Figure 6:
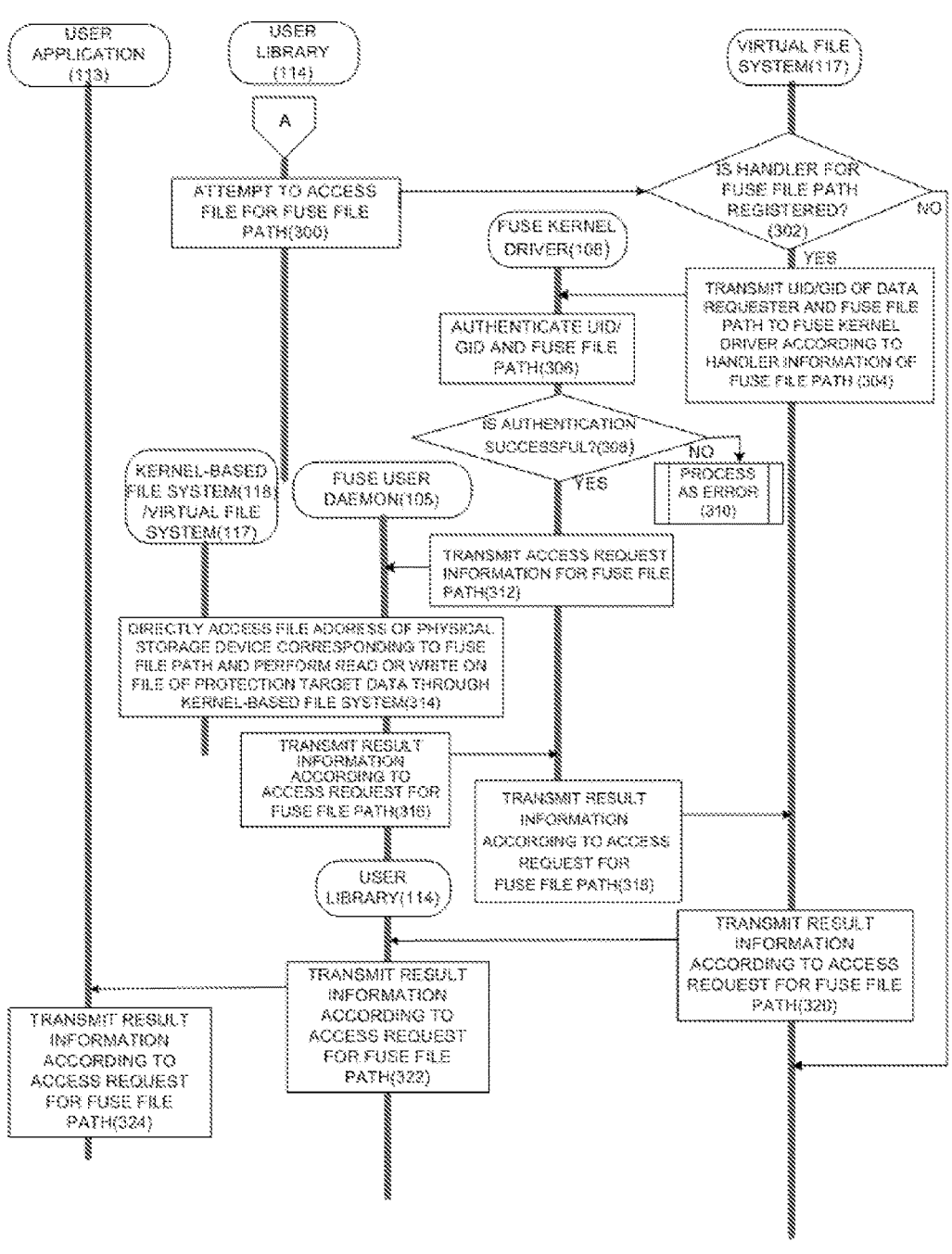

Hereinafter, the procedure of the method of protecting data according to the exemplary embodiment of the present invention described above will be described with reference to FIGS. 5 and 6. Referring to FIGS. 5 and 6, the user application 113 transmits information for requesting a file stored in a FUSE file path to the user library 114 according to a user's request (operation 200). Here, the FUSE file path may be set in advance as a file path for a file recording protection target data.

The user library 114 having received the information for requesting the file stored in the FUSE file path transmits information requesting to check whether a handler for the FUSE file path is registered to the virtual file system 117 (operation 201).

The virtual file system 117, in response to the request, returns information indicating whether the handler for the FUSE file path is registered to the user library 114 (operation 202).

When the handler for the FUSE file path is not registered, the user library 114 executes the FUSE daemon program 109 to attempt a FUSE mount (operation 204).

The FUSE daemon program 109, when executed, accesses the kernel-based file system 118 through the virtual file system 117 and requests a file address of the physical storage device 20 for a FUSE directory corresponding to the FUSE file path (operations 206 and 208). According to the request, the kernel-based file system 118 returns the file address of the physical storage device 20 for the FUSE directory to the FUSE daemon program 109 through the virtual file system 117 (operations 210 and 212). Here, the kernel-based file system 118 may store information about the file address corresponding to the FUSE directory in advance.

The FUSE daemon program 109 stores the file address of the physical storage device 20 for the FUSE directory, registers self as the FUSE user daemon 105, and calls the FUSE library program 110 to provide the FUSE file path and user authentication information to the FUSE library program 110 (operations 214 and 216).

The FUSE library program 110 transmits the FUSE file path and the user authentication information to the FUSE kernel driver 108 (operation 218).

The FUSE kernel driver 108 stores the FUSE file path and the user authentication information as well as transmitting handler information about the FUSE file path to the virtual file system 117 (operation 220).

The virtual file system 117 having received the handler information about the FUSE file path registers the handler information about the FUSE file path as well as notifying the user library 114 of FUSE mount (operations 222 and 224). When completion of FUSE mount is notified of, the user library 114 returns to operation 203 (operation 226).

Meanwhile, when FUSE mount is established, the user library 114 provides an access request for the file in the FUSE file path to the virtual file system 117 (operation 300). The virtual file system 117 checks whether a handler corresponding to the FUSE file path is registered in advance (operation 302). When a handler corresponding to the FUSE file path is registered in advance, the virtual file system 117 transmits UID/GID of a requester and a FUSE file path to the FUSE kernel driver 108 according to handler information about the FUSE file path (operation 304).

The FUSE kernel driver 108 checks whether the UID/GID and the FUSE file path provided by the requester correspond to UID/GID and a FUSE file path that are registered in advance to implement authentication (operation 306). When the authentication fails, the FUSE kernel driver 108 determines that the data request is made by an abnormal user and processes the request as an error (operation 310).

In contrast, when the authentication is successful (operation 308), the FUSE kernel driver 108 transmits access request information for the FUSE file path to the FUSE user daemon 105 (operation 312). The FUSE user daemon 105 having received the access request information directly accesses the file address of the physical storage device 20 corresponding to the FUSE file path through the kernel-based file system 118 and the virtual file system 117, and implements read or write on the file of the protection target data (operation 314). Here, when the access request for the file containing protection target data recorded in the FUSE storage area is a read request, the FUSE user daemon 105 reads the original file, decrypts the read result, and returns the decryption result, and when the request is a write request, the FUSE user daemon 106 encrypts content to be written and writes the encrypted content to the original file, thereby safely protecting the protection target data.

In addition, the FUSE user daemon 105 transmits result information according to the access request for the FUSE file path, which is the result of reading or writing the file of the protection target data, to the user library 114 through the FUSE kernel driver 108 and the virtual file system 117 (operations 316, 318, and 320). Upon receiving the result information according to the access request for the FUSE file path, user library 114 transmits the result information to the user application 113 (operations 322 and 324).

In addition, the FUSE mount state is unmounted upon elapse of a predetermined time or upon a user's request through the user application 113. That is, in response to a FUSE unmount request through the user application 113, the user library 114 requests FUSE unmount from the virtual file system 117 and the FUSE user daemon 105, and according to the FUSE unmount request, the virtual file system 117 initializes the handler information for the FUSE file path, and the FUSE user daemon 105 also initializes the physical address information corresponding to the FUSE file path as well as returning to the original state, that is, the FUSE daemon program 109.

The embodiments of the present invention described above have been disclosed for illustrative purposes, and those skilled in the art may make various modifications, changes, and additions within the spirit and scope of the present invention, and such modifications, changes and additions should be regarded as falling within the claims of the patent invention.

INDUSTRIAL APPLICABILITY

The present invention relates to data protection technology in a network, and more specifically, provides a method and apparatus for protecting data in a Linux-based operating system that are capable of storing a file containing protection target data in a FUSE-mounted storage area such that the file may be protected.

In addition, the present invention may provide an apparatus and method for safely protecting encryption keys used to protect data in a network.

The invention claimed is:

1. An apparatus for protecting data, comprising:
a physical storage device; and
a processor provided with a user application, a user library, a virtual file system (VFS), a kernel-based file system, a Filesystem in Userspace (FUSE) kernel driver, and a FUSE user daemon as software modules,
wherein, when the user application provides request information requesting access to a FUSE file path to the user library, the user library provides the request information to the VFS,
when a handler for the FUSE file path included in the request information is registered in advance, the VFS determines that a state is a FUSE mounted state and provides the request information to the FUSE kernel driver that is registered in advance,
the FUSE kernel driver provides the request information to the FUSE user daemon,
the FUSE user daemon directly accesses a file at a file address of the physical storage device predetermined to correspond to the FUSE file path through the kernel-based file system,
the FUSE user daemon returns access result information for the file of the file address of the physical storage device to the FUSE kernel driver,
the FUSE kernel driver returns the access result information for the file to the VFS,
the VFS returns the access result information for the file to the user library, and
the user library returns the access result information for the file to the user application,
wherein the processor is further provided with a FUSE daemon program and a FUSE library program, and
when the handler for the FUSE file path included in the request Information is not registered in the VFS, the user library determines that a state is a FUSE unmounted state and executes the FUSE daemon program,
the FUSE daemon program requests the file address of the physical storage device corresponding to the FUSE file path from the kernel-based file system according to an execution event, and
when the kernel-based file system returns the file address of the physical storage device, the FUSE daemon program stores the file address of the physical storage device to match the FUSE file path, registers self as the FUSE user daemon, provides the FUSE file path and user and group identification information corresponding to the FUSE file path to the FUSE kernel driver to be registered through the FUSE library program, and then determines that a state is the FUSE mounted state,
wherein the file for the FUSE file path includes protection target data, the physical storage device provides a FUSE storage area for storing the protection target data in the FUSE mounted state or FUSE unmounted state, the FUSE storage area in the FUSE mounted state or FUSE unmounted state has the same path.

2. The apparatus of claim 1, wherein the request information further includes user and group identification information, and the FUSE kernel driver is configured to:
check whether the user and group identification information included in the request information corresponds to user and group identification information predetermined to match the FUSE file path;
when the user and group identification information included in the request information corresponds to the user and group identification information predetermined to match the FUSE file path, determine that authentication is successful; and
only when the authentication is successful, provide the request information to the FUSE user daemon.

3. The apparatus of claim 1, wherein, when an access request for data of the file recorded at the file address of the physical storage device is a read request, the FUSE user daemon reads an original file, decrypts a result of the reading, and returns a result of the decryption, and when the access request is a write request, the FUSE user daemon encrypts content to be written and writes the content to an original file.

4. A method of protecting data performed by an apparatus including a physical storage device and a processor provided with a user application, a user library, a virtual file system (VFS), a kernel-based file system, a Filesystem in Userspace (FUSE) kernel driver, and a FUSE user daemon as software modules, the method comprising:
providing, by the user application, request information requesting access to a FUSE file path to the user library;
providing, by the user library, the request information to the VFS;
when a handler for the FUSE file path included in the request information is registered in advance, determining, by the VFS, that a state is a FUSE mounted state and providing the request information to the FUSE kernel driver that is registered in advance;
providing, by the FUSE kernel driver, the request information to the FUSE user daemon;
directly accessing, by the FUSE user daemon, a file at a file address of the physical storage device predetermined to correspond to the FUSE file path through the kernel-based file system;
returning, by the FUSE user daemon, access result information for the file of the file address of the physical storage device to the FUSE kernel driver;
returning, by the FUSE kernel driver, the access result information for the file to the VFS;
returning, by the VFS, the access result information for the file to the user library; and
returning, by the user library, the access result information for the file to the user application,
wherein the processor is further provided with a FUSE daemon program and a FUSE library program, and the method further comprising:

determining, by the user library, that a state is a FUSE unmounted state and executing the FUSE daemon program when the handler for the FUSE file path included in the request information is not registered in the VFS;

requesting, by the FUSE daemon program, the file address of the physical storage device corresponding to the FUSE file path from the kernel-based file system according to an execution event; and when the kernel-based file system returns the file address of the physical storage device, storing, by the FUSE daemon program, the file address of the physical storage device to match the FUSE file path, registering, by the FUSE daemon program, self as the FUSE user daemon, providing the FUSE file path and user and group identification information corresponding to the FUSE file path to the FUSE kernel driver to be registered through the FUSE library program, and then determining that a state is a FUSE mounted state, wherein the file for the FUSE file path includes protection target data, the physical storage device provides a FUSE storage area for storing the protection target data in the FUSE mounted state or FUSE unmounted state, the FUSE storage area in the FUSE mounted state or FUSE unmounted state has the same path.

5. The method of claim 4, wherein the request information further includes user and group identification information, and the FUSE kernel driver is configured to:

check whether the user and group identification information included in the request information corresponds to user and group identification information predetermined to match the FUSE file path;

when the user and group identification information included in the request information corresponds to the user and group identification information predetermined to match the FUSE file path, determine that authentication is successful; and only when the authentication is successful, provide the request information to the FUSE user daemon.

6. The method of claim 4, wherein, when an access request for data of the file recorded at the file address of the physical storage device is a read request, the FUSE user daemon reads an original file, decrypts a result of the reading, and returns a result of the decryption, and when the access request is a write request, the FUSE user daemon encrypts content to be written and writes the content to an original file.

\* \* \* \* \*